HOISTING MECHANISM

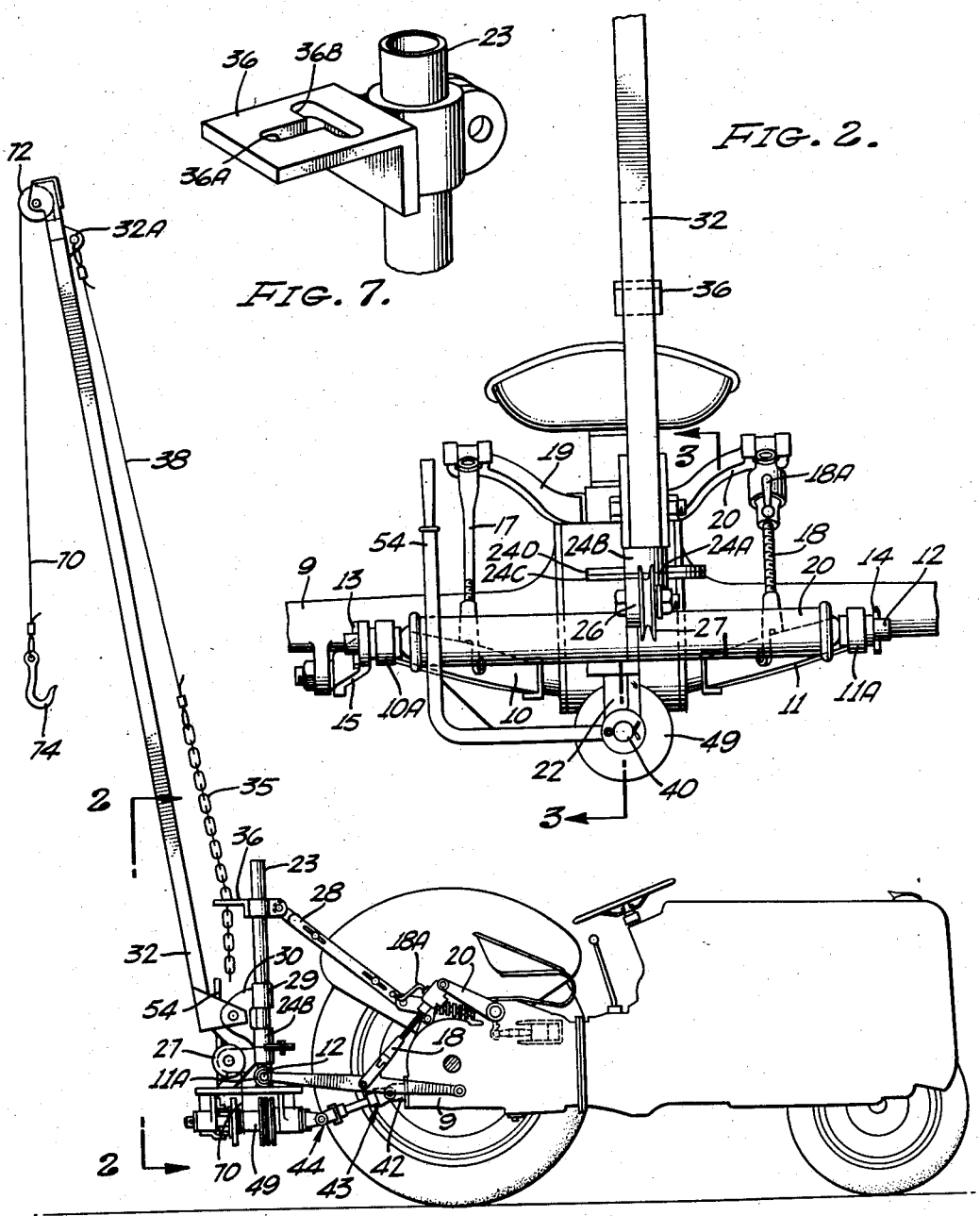

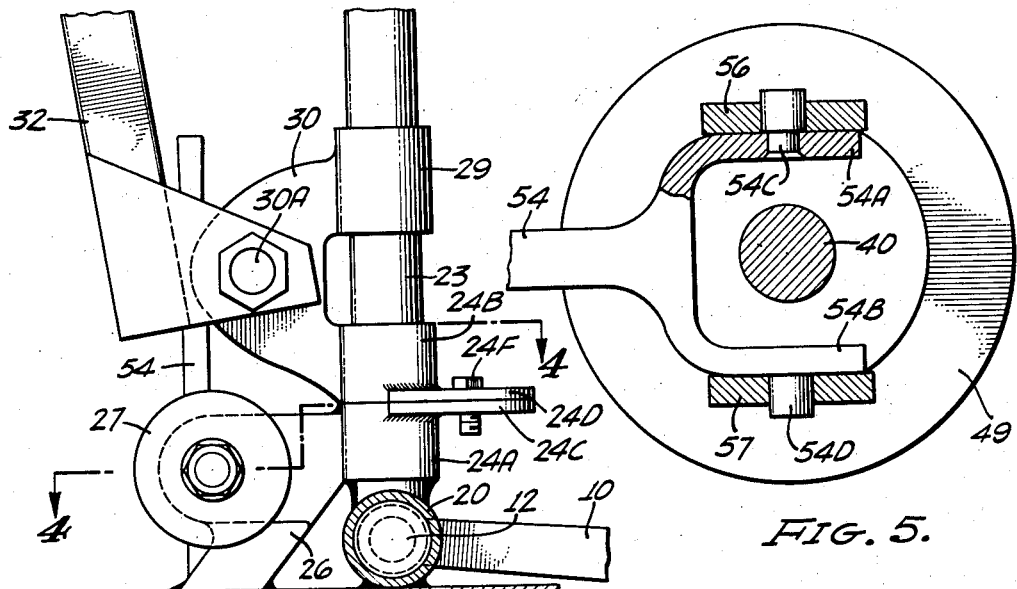
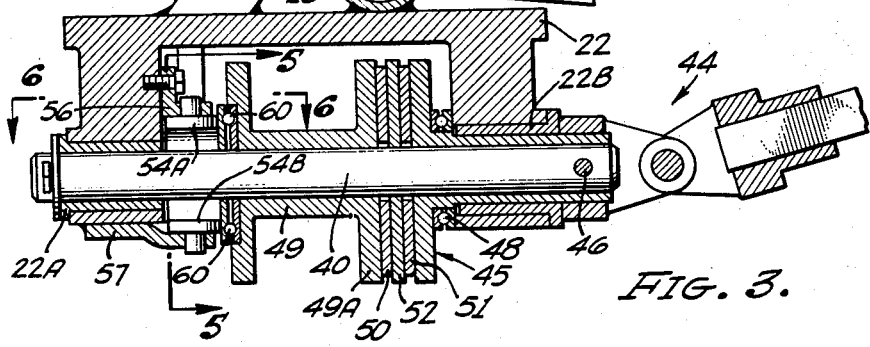
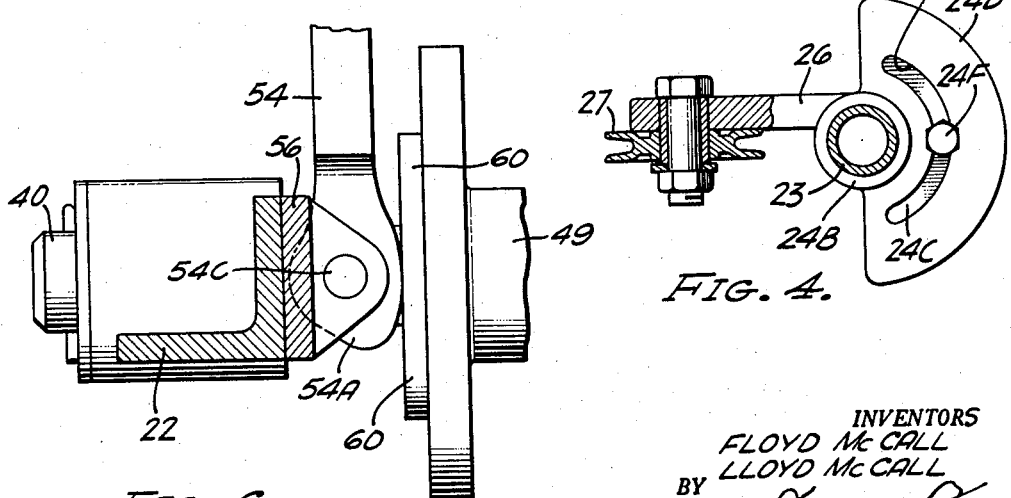
INVENTORS
FLOYD McCALL
LLOYD McCALL
BY Lyon Lyon
ATTORNEYS 2,894,645

Floyd McCall and Lloyd McCall, Romoland, Calif.

Application November 16, 1956, Serial No. 622,577

6 Claims. (Cl. 212—8)

The present invention relates to an improved hoisting means for use with tractors.

A feature of the hoisting mechanism is that it may be mounted on the conventional three-arm type of suspension presently found on tractors.

A specified object of the present invention is to provide an improved hoisting mechanism which is relatively simple, inexpensive and rugged.

Another specific object of the present invention is to provide an improved hoisting mechanism, particularly useful for handling bales of hay, the mechanism requiring the attendance of only one person.

Another object of the present invention is to provide an improved hoisting mechanism which may be conveniently mounted on conventional tractors for operation thereby.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view inside elevation showing a portion of a tractor with the hoisting mechanism mounted thereon in accordance with features of the present invention.

Figure 2 is a view taken in the direction indicated by the arrows 2—2 in Figure 1.

Figure 3 is a sectional view on the line 3—3 of Figure 2.

Figures 4, 5 and 6 are sectional views taken substantially on corresponding lines 4—4, 5—5 and 6—6 of Figure 3.

Figure 7 is a perspective view illustrating structure for fastening the boom supporting chain.

The hoisting mechanism is mounted on a pair of tractor arms 10 and 11 which have their inner ends pivoted on the tractor in conventional manner. The outer ends of arms 10 and 11 have annular bearing members 10A, 11A respectively, through which a generally horizontally extending shaft 12 passes. The outer ends of shaft 12 have cotter pins 13 and 14 passing therethrough to retain the shaft 12 in the bearing members 10A, 11A. A third supporting arm 15, for minimizing side sway of the assembly has its inner end pivotally mounted in conventional manner on the tractor chassis 9 and the outer end of arm 15 has an annular opening therethrough through which the shaft 12 extends. The arms 10, 11 and 15 are of the same radius so that the assembly carried on shaft 12 may be raised and lowered by the conventional lift mechanism of the tractor which comprises the adjustable length lift arms 17 and 18.

The lower ends of arms 17 and 18 are pivoted respectively to an intermediate portion of arms 10 and 11; and the upper ends of arms 17—18 are each pivoted to corresponding power-operated lift arms 19, 20 of the tractor. The length of arm 18 may be adjusted in a conventional manner, by rotating the crank 18A for leveling and other purposes.

The shaft 12 mounts a tubular housing 20 which is free to pivot on the shaft 12 and which has its outer ends abutting the bearing members 10A, 11A.

This tubular member 20, as shown in Figure 3, has welded thereto the winch housing 22 as well as the vertical supporting post 23 and the lower half 24A of a two-piece sleeve comprising the lower half 24A and the upper half 24B. The upper end of the post 23 is braced by the adjustable link 28 having its upper end pivoted to the member 36, the lower end of the link 28 being pivoted on the tractor chassis.

A pulley supporting bracket 26 has its lower end welded to the housing 22 and its upper end welded to the sleeve member 24A, and such bracket rotatably supports the cable pulley 27.

The upper sleeve member 24B is pivotally mounted on the post 23 and is joined to a like rotatable spaced sleeve 29 by a connecting bracket 30 which has pivotally mounted thereon the lower end of the boom 32.

For purposes of maintaining the sleeves 24A and 24B in adjusted relationship a pair of parallel extending contacting plates 24C and 24D are welded respectively to the sleeve members 24A and 24B. As shown in Figure 4, the plate 24D has a circular adjustment slot 24E therein through which a fastening bolt 24F extends, such bolt 24F being threaded in the lower plate 24C.

Thus, the boom 32 may be swung about the vertical axis of post 23 and maintained in such adjusted position by fastening bolt 24F. Further, the boom may be raised or lowered as desired and it is maintained in such adjusted raised or lowered position by the chain 35 which is releasably secured in the slotted portion 36A of bracket 36 secured to the post 23. The chain 35 is secured to one end of the cable 38 which has its other end secured to the boom bracket 32A.

It is noted with respect to Figure 7 that the chain engaging slotted portion 36A is contiguous with a larger open portion 36B in the bracket 36, and that such portion 36B is sufficiently large to allow passage of the chain, whereas the slotted portion 36A is just large enough to receive one link of the chain so that the chain may be conveniently released and allowed to move through the enlarged portion of 36B in adjustment of the height of the boom.

Referring to Figure 3, the winch housing 22 is provided with two spaced bearing inserts 22A and 22B through which the power driven shaft 40 extends. The shaft 40 is driven from the power take off shaft 42 (Figure 1) of the tractor through universal joints 43, 44. The shaft 40 has secured thereto the clutch member 45 and one element of the universal joint 44 by means of the pin 46. This clutch member 45 is journaled for rotation in the bearing insert 22B and a thrust bearing 48 is interposed between the casing 22 and the disc portion of the clutch element 45. It is thus understood that the clutch member 45 continually rotates when and as the tractor shaft 42 rotates.

The shaft 40 rotatably mounts a cable drum 49 and one flanged 49A portion of such drum 49 serves a a clutch element. Other elements of the clutch comprise friction discs 50, 51 and a floating disc 52 which separates the discs 50 and 51.

The cable drum 49 is moved to the right in Figure 3 to engage the previously described clutch and cause rotation of the drum 49, by a mechanism now described. Such clutch-operating mechanism includes a curved manully operated arm 54 which has its inner end formed with two fork portions 54A, 54B (Figure 5) and each of such fork portions has secured thereto a laterally extending pin in 54C, 54D respectively, which pass through apertured portions in the elements 56, 57 which are secured to the casing 22 as shown in Figure 3. More specifically, the element 56 is illustrated in the form of an attachable bracket on the casing 22 and the element 57 is illustrated as a plate welded on the casing 22. Thus, the actuating arm 54 is pivotally mounted on the casing 22. The arm forked portions 54A and 54B are, as illustrated in Figure 6, in the form of a cam so that pivoting of the arm 54 in the counterclockwise direction in Figure 6 results in application of pressure to the drum 49 through the thrust bearing 60 to thereby cause the clutch 49A, 45 to be engaged and the cable drum to be driven.

A cable 70 (Figure 1) has one of its ends anchored to the cable drum 49 and such cable 70 passes over the pulley 27, extends through the hollow boom 32, passes over the pulley 72 and has a hook 74 secured thereto.

In operation of the hoisting mechanism, a load is fastened to the cable 70, using the hook 74. The cable 70 may then be reeled on the cabled drum 70 to lift the load by operating the arm 54. Operation of the arm 54 serves to engage the clutch 49, 45 so that energy from the constantly rotating shaft 40 may be applied to the drum 49, to cause it to rotate and thereby reel in the cable 70. When it is desired to lower the load, thus lifted, the arm 54 is moved in the opposite direction to allow the clutch elements 49A, 45 to become disengaged to allow the load to descend under gravity forces. Indeed, the load may be suspended in an elevated position by applying the proper force to the arm 54, i.e., a force sufficiently large to allow some slippage, but not complete slippage between the clutch elements 49A and 45.

In accomplishing such lifting, the hollow boom 32 may be swung, about a substantially vertical axis, when the fastening nut 24F (Figure 4) is released. A limited amount of such pivotal movement of the hollow boom 32 may be accomplished since as observed in Figure 1, the axis of the supporting cable 38, when extended, passes through, or very close to, a point which is midway between the sleeves 24B, 29 and which lies on the axis of the supporting shaft 23. If desired, lifting may be accomplished without pivotal movement of the hollow boom 32 and in such case the bolt 24F is tightened to lock the boom to the post, while yet, however, allowing the boom 32 to be raised or lowered by pivoting the same about the axis of its pivot and 30A (Figure 3).

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Hoisting mechanism of the character described comprising in combination a tractor chassis, a pair of arms pivotally mounted on said chassis, power operated means associated with said tractor for raising said arms, a generally horizontally extending shaft interconnected between the ends of said arms, a casing pivotally mounted on said shaft, a winch rotatably mounted in said casing, a vertically extending tubular post extending upwardly from said casing, a bracket member rotatably mounted on said vertical post, a boom pivotally mounted on said bracket, a cable wound on said winch and extending upwardly through said boom, a cable attached to the upper end of said boom and adjustably secured to the tractor chassis, and a manually operated clutch for connecting the power take off shaft of the tractor to said winch to effect selective driving of the same.

2. Hoisting mechanism comprising in combination, a horizontally extending shaft for mounting on a tractor, a casing pivotally mounted on said shaft, a winch rotatably mounted in said casing, a vertical post extending upwardly from said casing, a bracket member rotatably mounted on said post, a boom pivotally mounted on said bracket member, a cable wound on said winch and passing upwardly through said boom.

3. Hoisting mechanism comprising in combination, a generally horizontal extending shaft for connection to pivoted arms of a tractor, a casing pivotally mounted on said shaft, a second shaft rotatably mounted in said casing for connection to a power take-off shaft of said tractor, a cable drum rotatably mounted on said second shaft, said second shaft having a flanged portion engagable with the cable drum, a lever pivotally mounted on said second shaft for moving said cable drum into frictional engagement with said flanged portion, said casing having a vertically extending post extending upwardly therefrom, a bracket member rotatably mounted on said post, a boom pivoted on said bracket member, a cable wound on said drum and passing upwardly through said boom.

4. Hoisting mechanism comprising in combination, a shaft, a sleeve rotatably mounted on said shaft, a casing secured to said sleeve, a post secured to said sleeve and extending generally perpendicular to the axis of said sleeve, a bracket rotatably supported on said post, a boom pivoted on said bracket, a power driven shaft rotatably mounted in said casing, a cable drum rotatably supported in said casing, and manually operated clutch means for establishing a driving connection between said drum and said power driven shaft, a cable on said drum and supported on said boom.

5. Hoisting mechanism comprising in combination, a tractor having a pair of pivoted arms, a shaft supported by said arms, a sleeve on said shaft, a support secured to said sleeve, a power driven shaft rotatably mounted on said support, a post secured to said sleeve and extending generally perpendicular to the axis of said power driven shaft and also perpendicular to the axis of the first mentioned shaft, a cable drum rotatably and slidably mounted on said power driven shaft, clutch means between said power driven shaft and said drum, an actuated member mounted on said support for establishing a driving connection between said power driven shaft and said drum, a bracket rotatably mounted on said post, means adjustably securing said bracket on said post, a hollow boom pivoted on said bracket, a cable wound on said drum and passing upwardly through said hollow boom.

6. Hoisting mechanism comprising in combination, a supporting shaft, arranged to extend generally horizontally, a sleeve mounted on said shaft, a post secured to said sleeve and extending generally perpendicular to the axis of said shaft, a bracket member rotatably mounted on said post, a boom pivoted on said bracket, cable means attached to the upper end of the boom and secured to said post with the axis of said cable means when extended, passing substantially through the region at which said bracket is supported on said post.

References Cited in the file of this patent
UNITED STATES PATENTS

| 735,862 | Dundon | Aug. 11, 1903 |
| 2,251,595 | Messman | Aug. 5, 1941 |
| 2,346,404 | Thwaites | Apr. 11, 1944 |
| 2,632,628 | Bunting | Mar. 24, 1953 |

FOREIGN PATENTS

| 664,356 | Great Britain | Jan. 2, 1952 |